US008646917B2

(12) United States Patent
Reichow et al.

(10) Patent No.: US 8,646,917 B2
(45) Date of Patent: Feb. 11, 2014

(54) THREE DIMENSIONAL DISPLAY WITH MULTIPLANE IMAGE DISPLAY ELEMENTS

(75) Inventors: Mark A. Reichow, Valencia, CA (US); Daniel M. Joseph, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 423 days.

(21) Appl. No.: 13/010,602

(22) Filed: Jan. 20, 2011

(65) Prior Publication Data
US 2012/0188637 A1      Jul. 26, 2012

(51) Int. Cl.
| G03B 21/00 | (2006.01) |
| G03B 21/14 | (2006.01) |
| G03B 21/22 | (2006.01) |
| G03B 21/26 | (2006.01) |
| G03B 21/56 | (2006.01) |
| G03B 21/60 | (2006.01) |
| G02B 27/22 | (2006.01) |
| H04N 5/64 | (2006.01) |
| H04N 13/00 | (2006.01) |
| H04N 13/04 | (2006.01) |
| H04N 15/00 | (2006.01) |

(52) U.S. Cl.
USPC ............... 353/7; 353/79; 353/94; 353/119; 348/42; 348/52; 348/840; 359/449; 359/458; 359/462; 359/477

(58) Field of Classification Search
USPC ............ 353/7–10, 30–31, 46, 48, 71, 74, 79, 353/94, 119; 348/42, 44, 51–52, 54–60, 348/840; 359/462, 464–465, 475, 449, 458, 359/477–478
See application file for complete search history.

(56) References Cited

U.S. PATENT DOCUMENTS

| 3,006,241 | A | * | 10/1961 | Marks et al. ............... 353/10 |
| 3,582,961 | A | * | 6/1971 | Shindo ..................... 348/44 |
| 3,891,305 | A | * | 6/1975 | Fader ...................... 359/478 |
| 4,757,626 | A | * | 7/1988 | Weinreich ................. 40/427 |
| 5,329,323 | A | * | 7/1994 | Biles ...................... 353/10 |
| 5,764,317 | A | * | 6/1998 | Sadovnik et al. ........... 349/5 |
| 5,956,180 | A | * | 9/1999 | Bass et al. ................ 359/479 |
| 6,752,498 | B2 | * | 6/2004 | Covannon et al. .......... 351/240 |
| 7,016,116 | B2 | * | 3/2006 | Dolgoff ................... 359/630 |
| 7,168,808 | B2 | * | 1/2007 | Perlin et al. .............. 353/7 |
| 7,562,983 | B2 | * | 7/2009 | Kim et al. ................. 353/10 |
| 7,587,120 | B2 | * | 9/2009 | Koo et al. ................. 385/147 |

(Continued)

Primary Examiner — Tony Ko
Assistant Examiner — Jori S Reilly-Diakun
(74) Attorney, Agent, or Firm — Marsh Fischmann & Breyfogle, LLP; Kent A. Lembke (57) ABSTRACT

An apparatus is provided for generating or creating an autostereoscopic or three-dimensional (3D) display. The apparatus has a foreground display assembly including a display element such as a transparent projection screen film and a projector projecting a first set of two-dimensional (2D) content onto a rear surface viewable by a viewer via a front surface. The apparatus includes a background display assembly including a display element displaying a second set of 2D content. The apparatus includes an intermediate display assembly including a display element, such as an optical shutter window, positioned between the foreground display element and the background display element. This assembly includes a projector projecting a third set of 2D content on the front or rear surface of the optical shutter window. The first, second, and third sets of 2D content are concurrently visible and the use of three spaced apart display planes creates a 3D illusion.

17 Claims, 8 Drawing Sheets

(56) References Cited

U.S. PATENT DOCUMENTS

| | | | |
|---|---|---|---|
| 7,719,770 B2 * | 5/2010 | Jang | 359/633 |
| 7,736,004 B2 * | 6/2010 | Hong et al. | 353/7 |
| 2002/0163482 A1 * | 11/2002 | Sullivan | 345/6 |
| 2007/0296644 A1 * | 12/2007 | Hong et al. | 345/4 |
| 2008/0304013 A1 * | 12/2008 | Seo | 353/8 |
| 2009/0268016 A1 * | 10/2009 | Hasegawa et al. | 348/51 |
| 2012/0081524 A1 * | 4/2012 | Joseph et al. | 348/51 |

* cited by examiner

THREE DIMENSIONAL DISPLAY WITH MULTIPLANE IMAGE DISPLAY ELEMENTS

BACKGROUND

1. Field of the Description

The present description relates, in general, to the illusion of stereoscopic or three dimensional (3D) image generation and projection, and, more particularly, to systems and methods for producing 3D images or depth and space media illusions without requiring viewers to wear 3D glasses or the like (e.g., multiplane display systems providing a 3D display to viewers rather than using projected images requiring a viewing technology such as particular glasses to be properly viewed).

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention. However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs. Hence, there remains a need for systems and methods for providing autostereoscopic or 3D displays in a cost effective manner, in the presence of higher ambient light levels, and without the need for special eye or head wear.

SUMMARY

The inventors recognized that content presented with dimension and depth is often more compelling, interesting, and eye-catching when compared with mere two-dimensional (2D) presentation of similar content. However, it was also recognized that there is a large amount of previously created and available 2D content and that creating new content and/or converting existing 2D content to 3D format digitally is typically very expensive. With these understandings in mind, the inventors created the multiplane display systems described herein that provide an illusion of depth and space (or a 3D display or effect) using two or more 2D images or sets of content. The multiplane display systems are also particularly well-suited for venues with limited available space.

Briefly, each display system includes at least a foreground and a background display assembly that each includes a display element and a content source. A first set of 2D content is provided via the foreground content source to the foreground display element to display a foreground image on a first surface (e.g., a planar surface in a first or foreground plane), and a second set of 2D content is provided by the background content source to the background display element to display a background image on a second surface (e.g., a planar surface in a second or background plane). The first and second surfaces are "multiplane" in the sense that they are positioned in spaced apart planes, e.g., parallel planes that are 2 to 12 inches or more apart. The first and second sets of 2D content are viewable concurrently on the first and second display surfaces by a viewer as the foreground display element is at least partially transparent or transmissive of light from the background display element, and the first and second sets of 2D content combine to create a 3D image or display.

For example, an existing 2D content file may be processed to create the foreground and background sets of 2D content, and then the display on spaced apart planar surfaces creates a 3D effect or illusion of space and depth using 2D imagery. For example, the foreground display element may include a liquid crystal or other film with adjustable opacity and the foreground content source may include a projector projecting the 2D content on a rear or back surface of the foreground display element, and the background display element may include a liquid crystal display (LCD) or similar display device that is used to display the background 2D content. In many embodiments, the 3D display system also includes an intermediate display assembly including a display element, such as a transparent projection screen film, that is used as a front or rear projector screen to display intermediate 2D content projected from a front or rear projector (e.g., an intermediate 2D content source). The intermediate display element is typically planar and positioned between the foreground and background planes (and display elements located in such planes) and spaced apart some distance from each of these planes. In this manner, a third layer of 2D images are provided to further the illusion of depth and space provided to a viewer that concurrently views 2D content displayed on these three layered display elements.

In some embodiments, an additional set of content is provided in the 3D display system to improve the illusion of space and depth. Specifically, a controller or control system may be provided in the 3D display system that controls operation of each of the display assemblies to selectively modify the displayed 2D content (e.g., the foreground, intermediate, and background images being displayed on the multi-planed display surfaces) over time. In one example, the additional set of 2D content includes plane or layer-jumping content that is handed off in a synchronized manner by the controller/control system to be displayed sequentially on differing ones of the display elements. For example, a 2D image of a character or animal (e.g., a bird) may first be displayed on the foreground display element and move about in this plane, and then second be displayed on the intermediate display element so as to appear further away from the viewer. Such handing-off of media from one display assembly and surface to another significantly heightens the illusion of depth and space of the display, and the size, shape, coloring/brightness, and the like of the additional or plane-jumping content may be modified with each jump or move to enhance the realism of an object or character moving further away (or closer toward) a viewer.

More particularly, an apparatus is provided for generating or creating an autostereoscopic display. The apparatus has a foreground display assembly including a display element with a front surface and a rear surface and also including a projector projecting a first set of two-dimensional (2D) content onto the rear surface that is viewable by a viewer via the front surface. The apparatus also includes a background display assembly including a display element spaced apart from the foreground display element and with a front surface facing toward the rear surface of the foreground display element, the background display element displaying a second set of 2D content on the front surface of the background display element. Further, the apparatus includes an intermediate display assembly including a display element positioned between the foreground display element and the background display element with a front surface facing and spaced apart from the rear surface of the foreground display element and with a rear surface facing and spaced apart from the background display element, the front surface of the intermediate display element displaying a third set of 2D content. In practice, the foreground and intermediate display elements include films or screens that are at least partially transmissive to light (e.g., translucent to nearly opaque), whereby the displayed first, second, and third sets of 2D content are concurrently viewable via the front surface of the foreground display assembly to provide a 3D image or a display with depth and space.

In some embodiments of the apparatus, the foreground display element and intermediate display element each include a film of at least translucent material and the foreground display assembly includes a projector projecting the first set of 2D content on the rear surface of the foreground display element. In such embodiments, the foreground display element may include a transparent projection screen film. Also in such embodiments, the intermediate display element may take the form of an optical shutter window or a transparent projection screen film. In these cases, the intermediate display assembly may include a projector projecting the third set of 2D content onto the front surface of the intermediate display element (e.g., to limit blow by as compared with using rear projection on this display element).

In some exemplary implementations, the background display element may include an emissive display device with a monitor providing the front surface of the background display element (e.g., an LCD or other monitor). In some cases, frames of the first, second, and third sets of 2D content are displayed in a synchronized manner (e.g., frames of each set may be retrieved from an original 2D media file and then played/projected concurrently but in differing display layers or planes) to provide a combined 3D image in which the first set of 2D content is in a first display plane, the third set of 2D content is in a second display plane an offset distance from the first display plane, and the second set of 2D content is in a third display plane an offset distance from the second display plane. In such embodiments of the apparatus, the first, second, and third display planes may be parallel to each other with the offset distances being each at least about 6 inches (such as 10 to 18 inches or the like).

DETAILED DESCRIPTION OF THE PREFERRED EMBODIMENTS

Briefly, embodiments described herein are directed toward three dimensional (3D) display devices or systems that are autostereoscopic, as a viewer may perceive depth or the 3D effects in the displayed image without the use of 3D glasses or eyewear (e.g., no need for colored or switching lenses or the like). The 3D display devices described may be thought of as multiplane devices or systems as a typical embodiment will include two or more display devices (such as planar projection screens) that are used to display foreground and/or intermediate-depth images and a rear or background display device (e.g., a front or rear projection screen or film or a LCD or other emissive display device).

The display surfaces of each of these display devices are spaced apart and typically arranged to be in parallel planes (multiple display planes). Two-dimensional (2D) images or content (still or video) are provided on each of the foreground and intermediate display devices as well as on the background display device (e.g., with short throw projectors on at least the foreground and intermediate display devices), and the foreground and intermediate display devices include projection films or screens that are at least partially translucent to transparent such that the 2D imagery presented on the intermediate and background display elements are visible to a viewer. In other words, a viewer's eyes concurrently receive light from all of the display devices (or their display surfaces) so as to perceive a 3D image with two or more depths or layers (associated with the planes).

The depth effect or illusion is further enhanced by handing off media between the planes or display surfaces, and, in some embodiments, the controller or control system functions to synchronize changes in the displayed 2D content of the display elements to move additional 2D content from one display element to another. For example, an animated character or a video of a live character may first be displayed in the background display element and then "move" to the intermediate and then the foreground display elements, which, to a viewer, seems to fill in the space between the planes containing the three or more display surfaces as the character is "present" in their mind between the planes during the rapid layer/plane transitions or movements (e.g., the human brain perceives the character also at the intervening depths or planes between display surfaces such as projection films/screens).

In one design prototype, the inventors created a 3D display device or system that included a frame that supported a foreground display element, an intermediate display element, and a background display element. Each were positioned in separate spaced-apart but parallel planes within the frame such that any 2D images displayed in each element were at differing distances from a viewer (or a viewing zone). In this prototype, each display element was fabricated to include either a transparent projection screen film such as a sheet of material used for window projections (e.g., a film of material that is generally transparent yet reflects light) or a liquid crystal film such as a sheet of material used for privacy glass (e.g., with adjustable opacity based on applied voltage). In some cases, these films or materials are combined. These films provide projection and/or display surfaces that are positioned in multiple planes (e.g., the display device is a multiplane display device or a device with 2 or more scenic projection planes for foreground, midground, and background 2D scenic elements).

To create the 2D content for each layer, an entire or full 2D scene frame may be processed to separate the foreground, midground/intermediate, and background components or content (e.g., specify 2D content for each plane or layer). This content is stored in memory or data storage, and then a controller is used to feed the particular sets of 2D content to a projector (or LCD or other monitor/display) for each plane or layer's display element. For example, a set of 2D content that is identified as foreground imagery is fed to a projector that projects onto the rear or back surface of the foreground display element (e.g., transparent projection screen film) such that it may be viewed by a viewer via its front surface. Concurrently a set of 2D content that is identified as background imagery is fed to a projector (or to a LCD or similar monitor) that projects onto the front or back surface of a background display element positioned in a plane behind and offset from the foreground display element. The viewer can see through the foreground display element while seeing/perceiving the foreground images such that the viewer perceives both foreground and background images at two depths or in two offset planes to view a 3D image.

In practice, liquid crystal film is useful in one or more of the display elements because it is tunable in its transparency, with its material changing opacity by means of varying the voltage sent to it (such as by a controller of a 3D display system described herein which may include a display or illusion program or software that it runs to program or selectively set the voltage levels provided to this display element to control and vary opacity over time to do additional (relative to the 3D effect) special effects with the media). It can appear roughly transparent or completely opaque. Because of these characteristics, a 2D image projected onto this film can appear as a solid or be tuned/adjusted to appear more translucent, which may be desirable for some 3D displays (e.g., have an intermediate 2D image that is more "ghostly" or translucent than the foreground and background images).

As will be quickly understood from the above and following discussion, the 3D display system/device described creates an opportunity to present 2D animation (old or new content) so as to create a 3D visual experience. The workflow and production of the sets of 2D content for each layer or plane may be produced with software created specially (or existing) to separate elements or layers of 2D media content from a whole scene (e.g., on a frame-by-frame basis for an animated film or photographic film) Each element or layer of 2D content is linked to be shown or displayed concurrently and it can be transmitted by the controller (that may be running an illusion/display program) in a synchronized manner to the appropriate layer projector or display device (such as an LCD or other emissive display that may be used for the background display element). In some embodiments, one or more of the display assemblies may be used to display or present real-time interactive media content and/or live video streams (e.g., place the viewer into the 3D imagery such as in the midground plane to interact with other displayed content).

Figure 1:
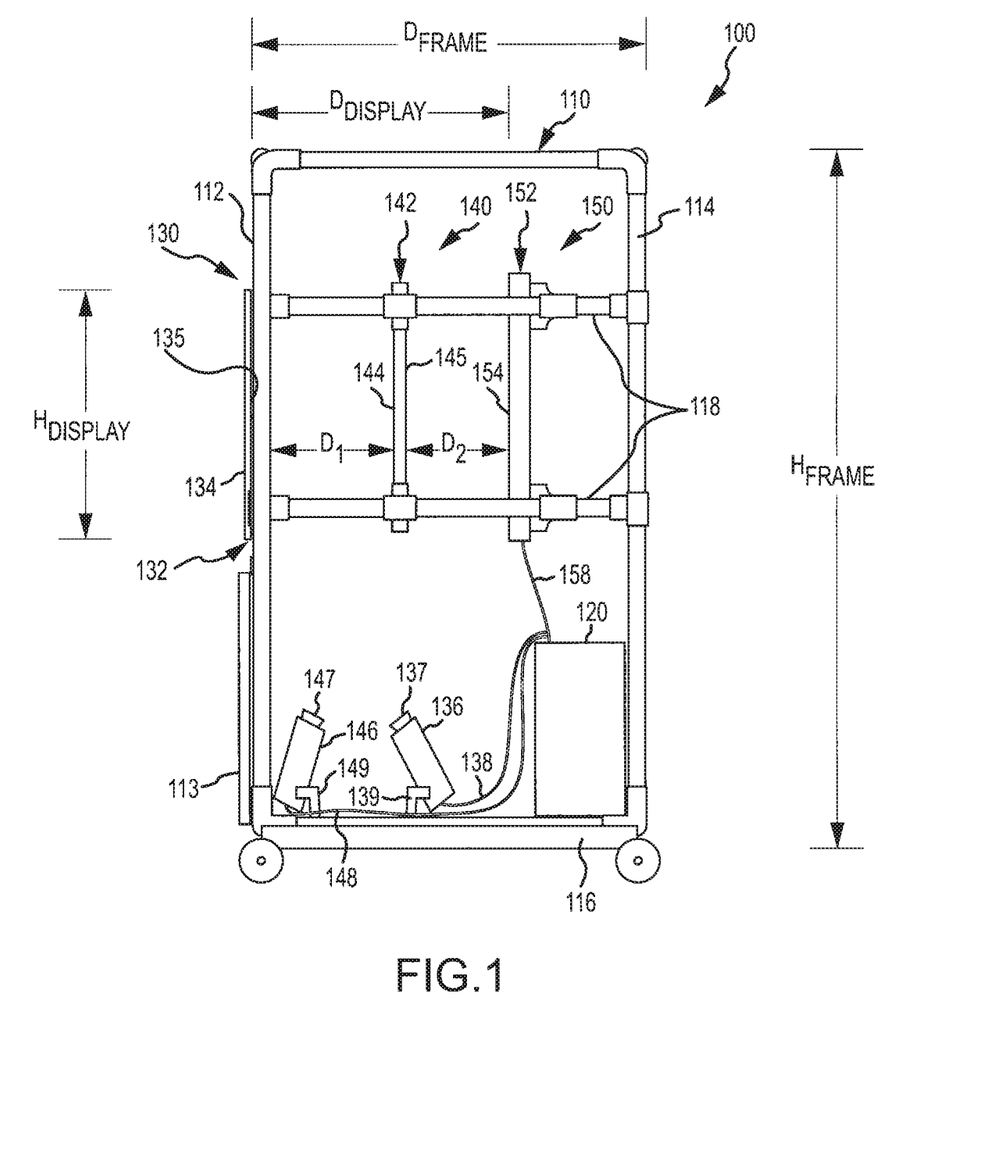
FIG. 1 illustrates a side view of a 3D display device (or multiplane display system or the like) of one embodiment that includes a foreground, an intermediate, and a background display assembly to display three sets of 2D content on spaced apart but concurrently viewable display surfaces.
Figure 2:
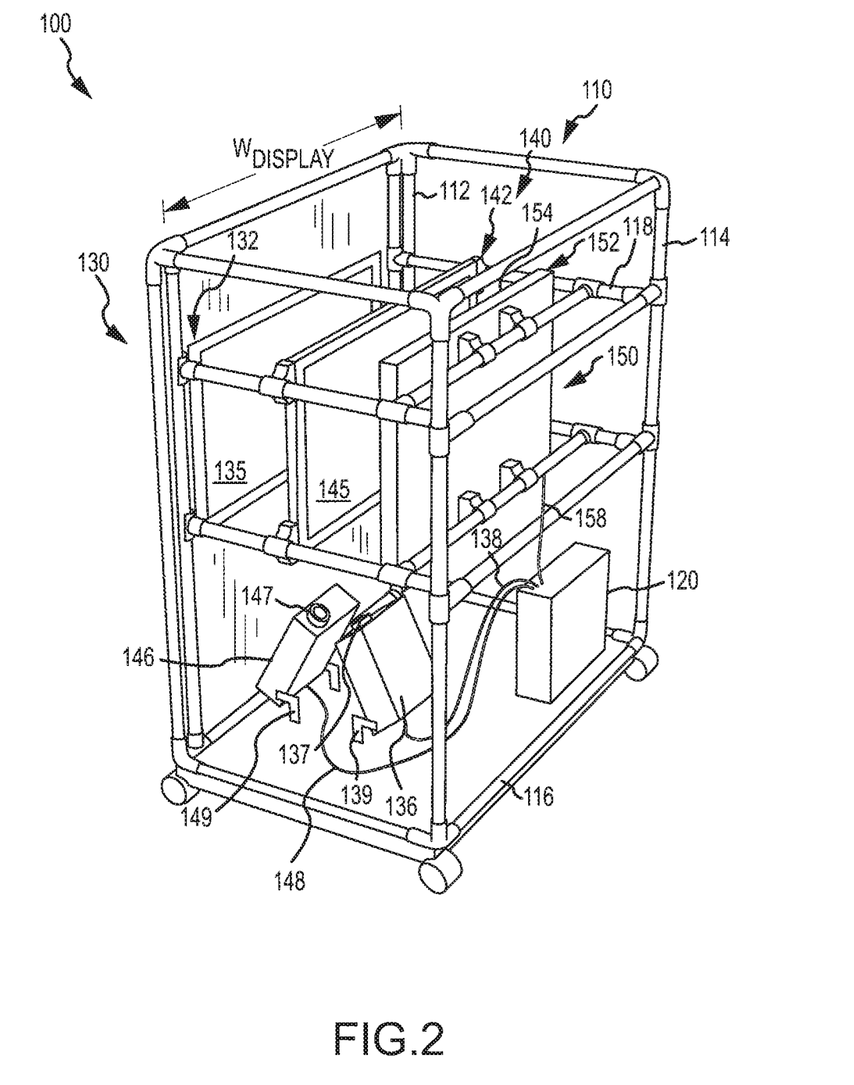
FIG. 2 is a rear perspective view of the 3D display device of FIG. 1.
Figure 3:
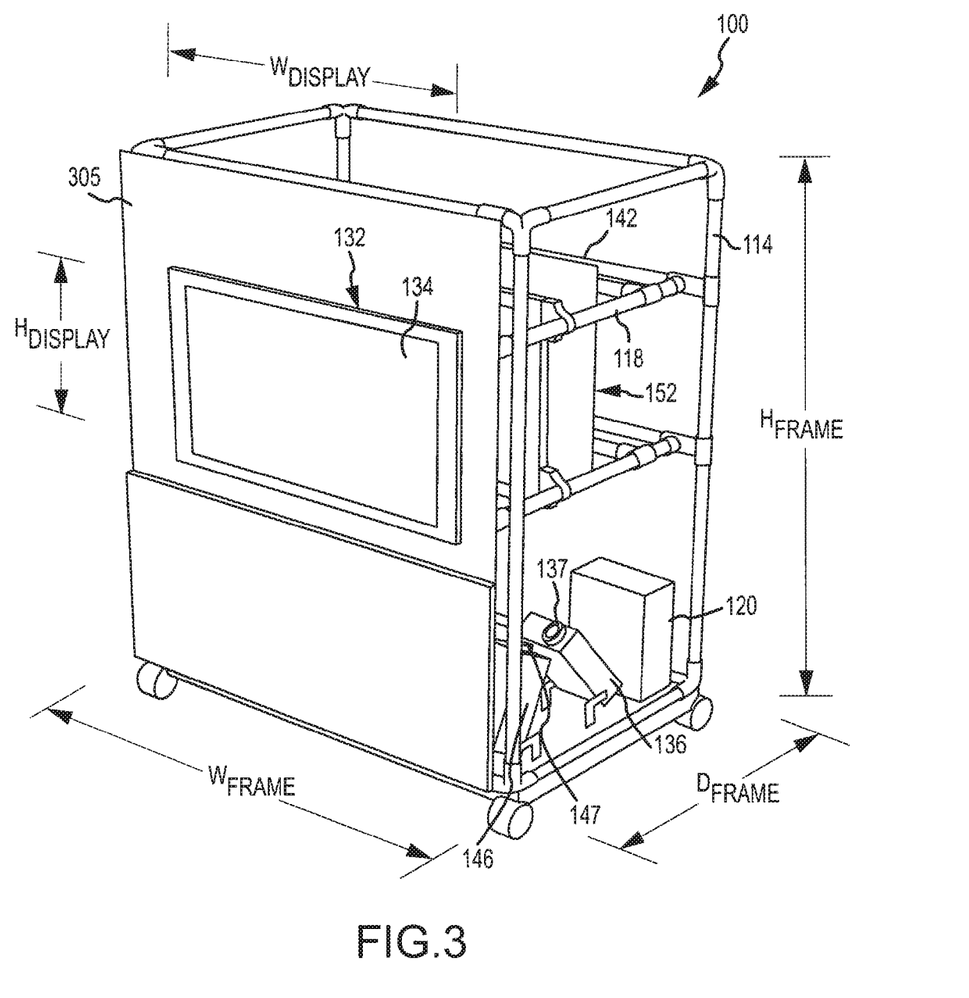
FIG. 3 is a front perspective view of the 3D display device of FIGS. 1 and 2.

FIGS. 1-3 illustrate a 3D display device 100 of one embodiment of the description. As discussed, one advantage of the 3D display device 100 is that it can be relatively compact and be fit into many small spaces with its useful form factor. To this end, the 3D display device 100 includes a frame or support assembly 110 with a front frame member 112, a rear frame member 114, and a base frame member 116 extending between the front and rear frame members 110, 112. Further, the assembly 110 includes hanging rods or members 118 extending between the front and rear frame members 110, 112 at some height above the base member 116. The hanging members 118 are used to hang or vertically support the two or more display elements 132, 142, 152 and to position these in spaced apart locations (e.g., scenic display planes that may be parallel to each other).

With these components, the frame or support assembly 110 has a height (e.g., 3 to 7 feet or more), $H_{Frame}$, a depth (e.g., 2 to 4 feet or more), $D_{Frame}$, and a width (3 to 6 feet or more), $W_{Frame}$, and the location of the hanging members 118 defines a height or location for the viewing zone (e.g., where the display elements 132, 142, 152 are located above base 116), and this may be chosen to coincide with an average height of an expected viewer when the 3D display device 100 is used for standing or walking viewers or another height to suit a particular implementation. The frame or support assembly 110 also may include front (and side, not shown) shields or screens 113, 305 that hide internal components (such as the display elements 142, 152 and projectors 136, 146) as well as frame members from view of a viewer outside the 3D display device 100.

More significantly, the 3D display device 100 includes a foreground display assembly 130, a midground/intermediate display assembly 140, and a background display assembly 150 supported within or on the frame 110. The foreground display assembly 130 includes a foreground display element 132 that includes a front or display surface 134 and a rear or projection surface 135. The foreground display assembly 130 further includes a projector 136 with a lens or output 137 that is focused upon or targets the rear or projection surface 135, and the projector 136 is affixed or supported on the base frame member 116. The 3D display device 100 further includes a controller or control system 120 (e.g., a 2D media server) that is interconnected as shown at 138 to the projector 136 at least to feed it 2D content, which the projector 136 then projects from lens 137 onto the rear surface 135. Typically, the 2D content is a set of foreground images extracted or retrieved from 2D digital media or the like.

As discussed above, the foreground display element 132 may be fabricated to include a sheet with a width and a height (or a differing shape other than rectangular) of transparent projection screen film or liquid crystal film. In this way, light with images from projector 136 that are projected upon the rear surface 135 are displayed via front or display surface 134 to a viewer as is light with images from display surfaces 144 and 154. For example, the display element 132 may include a rectangular sheet (e.g., 1 to 3 feet or more in height, $H_{Display}$, and 2 to 6 feet or more in width, $W_{Display}$) of a transparent projection film, such as Dilad™ Screen (Type T40SI) or the like by Kimoto, which is adapted to have a transparency that allows objects behind the film to be visible when no projection is received and in areas where no image is projected (or the light behind it overcomes the projected light) due to the light scattering ability of the film's materials. In other cases, though, the display element 132 may include a screen or film of liquid crystal material or an optical shutter-based device/element defining the height, $H_{Display}$, and width, $W_{Display}$, of the imagery displayed to the viewer such as an optical shutter product that is configured to change from opaque to substantially transparent with voltage, e.g., a window or LC film available from Citala (e.g., a flexible optical shutter window based on Citala's Onyx™ technology or the like), from Polytronix, Inc., or the like. The projector 136 may take many forms to practice the foreground display assembly 130 such as a wired or wireless, DLP or other projector (e.g., a higher definition, short throw projector with a brightness up to 1600 to 4000 or more lumens) selected to suit the particular display element (front or rear projection), to suit the frame/environment to control blow by, and the like.

The intermediate or midground display assembly 140 is positioned in the frame 110 adjacent or behind the foreground display assembly 130. The midground display assembly 140 includes a midground display element 142 that is only visible through the window defined by the foreground display element 132. The display element 142 includes a front surface 144 and a rear surface 145. The front surface 144 is proximate to the foreground display element 132 and is spaced apart from its display surface 134 by a distance, $D_1$, such that images or 2D content displayed on the surfaces 134, 144 are displayed in differing planes or at differing depths when perceived by a viewer concurrently via the foreground display element 132. The distance, $D_1$, between the foreground and midground planes may vary but typically ranges from several inches to 1 to 2 feet or more (with one embodiment using a range of 10 to 18 inches).

In the embodiment of FIGS. 1-3, the display element 142 is a front projection device or screen, and the midground display assembly 140 includes a projector 146 with lens or output 147 focused upon or targeting the front surface 144. The projector 146 is mounted upon base 116, and it is selectively operated (e.g., 2D media or content fed via line or wireless connection 148) by the controller 120 to project midground 2D content onto front or projection surface 144. The 2D content on surface 144 is visible to a viewer through the transparent (or at least translucent) foreground display element 132 (concurrently with foreground 2D content projected on surface 135 by projector 136). This midground 2D content appears to be behind the content projected on surface 135 by about the distance, $D_1$, separating the two display elements 132, 142. To provide such a projection surface and allow concurrent viewing of background display element 152, the display element 142 may be an LC film/window or transparent projection film as described above for the foreground display element 132 (note, these two elements 132, 142 may take the same form or may differ such as by using a projection film for element 132 and an LC film or optical shutter window for element 142).

Further, the 3D display device 100 includes the background display assembly 150 that includes display element 152, such as an emissive display device (e.g., an LCD or the like such as, but not limited to a high definition (HD) consumer-grade LCD such as one available from LG (e.g., the 47LD520 or similar product) or other manufacturer). The display element 152 is fed background 2D content via line or wireless connection 158, which it functions to display on monitor or display surface 154. The display surface 154 faces the rear surfaces 135 and 145 such that it is visible through both the foreground and midground display elements 132, 142 (which are both at least partially transparent to translucent). The display surface 154 is a distance, $D_2$, from the midground display element 142 (or its display surface 144) such that any 2D content displayed by element 152 appears to be the distance, $D_2$, behind the 2D content shown via midground display surface 144 and a display depth, $D_{Display}$, behind the foreground display surface 134. Again, the plane separation distance, $D_2$, may be varied widely to practice the invention such as several inches to several feet, with one embodiment using a separation distance, $D_2$, of 10 to 24 inches.

As will be appreciated, the content selected for display in the planes associated with surfaces 134, 144, 154 may be chosen such that it is presented in at least partially different portions of the display real estate or area. In this manner, the 2D content in the foreground display surface 134 will not fully block or cover the 2D content in the midground display surface 144, and background display surface 154 and content in the background display surface 154 will not completely cover or washout background content on surface 154. For example, the foreground content may be assigned the bottom third of the display real estate (e.g., a 2 by 4 foot rectangle) while the midground content is assigned the middle third and the background content is assigned the upper third of the real estate. Of course, this is a simplistic example, and, in practice, the selection of 2D content from an original 2D media frame will in effect cause the selected content to only partially overlap (or abut against each other in the projected display and its real estate or profile).

The 3D display device 100 provides a rear projection foreground display device 132, a front projection midground display device 142, and an emissive display background display device 152. However, the concepts described herein are not limited to this particular arrangement. For example, the 3D display concepts may broadly be thought of as providing one or more projection screens in the foreground or in front of an emissive display or other monitor. In another example, the 3D display concepts may be thought of as three or more layers or planes of 2D media presented in a synchronized and concurrent manner to achieve a 3D display with depth and space when perceived by a viewer. Each of the display elements positioned in front of the rear or background devices is configured with a portion that is translucent to transparent to light emanating from the background (and midground) display surfaces such that 2D content on each layer or plane of the 3D display device is at least partially concurrently visible by a viewer.

Figure 4:
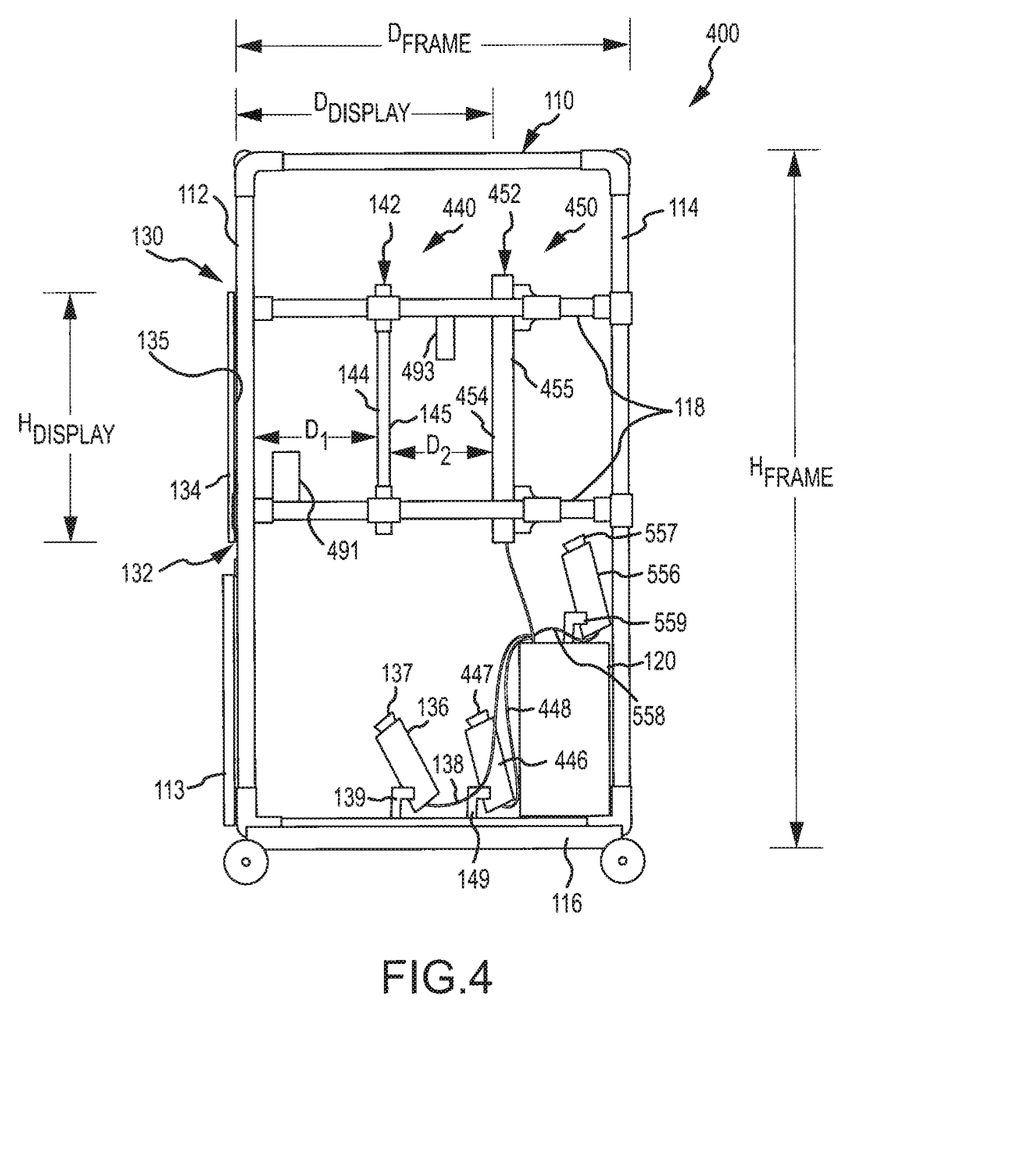
FIG. 4 illustrates a side view of another 3D display device similar to that shown in FIG. 1 (with like components having like numbering) in which the intermediate and background display assemblies are rear projection devices.

FIG. 4 illustrates another embodiment of a 3D display device 400 according to the invention. The device 400 includes components used in device 100 and these components are given like numbers and may not be discussed in detail again. The 3D display device 400 is similar to device 100 in that it includes a foreground display assembly 130, an intermediate display assembly 440, and a background display assembly 450. These assemblies 130, 440, 450 are arranged to provide first, second, and third display surfaces 134, 144, and 454 that are spaced apart and in parallel planes (e.g, device 400 is again a multiplane display system). As with the device 100, the foreground display assembly 130 includes a display element 132 (such as transparent projection screen film) with a rear surface 135 upon which foreground 2D content is projected by projector 136 in response to operation by controller 120. This results in a foreground 2D image being displayed on or being visible via front or display surface 134.

The 3D display device 400 also includes an intermediate display assembly 440, but, in contrast to device 100, the assembly 440 is configured for rear projection of 2D content. The assembly 440 includes a display element 142 such as a transparent projection screen or the like. A projector 446 is provided with lens or output 447 focused upon rear surface 145 of the film of element 142 such that a 2D image is visible to a viewer via front or display surface 144. The projector 446 is mounted on base 116 with connector 449, and the controller 120 may selective transmit midground 2D content via wired or wireless connection 448 to the projector 446.

Similarly, the 3D display device 400 includes a background display assembly 450 that instead of being an emissive display includes a display element 452 in the form of a rear projection screen. The screen element 452 includes a rear or projection surface 455 that faces or is exposed to projector 556 that has its output lens 557 targeting the surface 455. The projector 556 is mounted via connector to frame 110, and the controller 120 operates to selectively transmit background 2D content via wired or wireless connection 558 to the projector 556 for projection onto surface 455. As a result of the makeup of the rear projection screen element 452, the 2D content is visible via front or display surface 454, and the associated light is transmitted through both intermediate display element 142 as well as foreground display element 132 such that a viewer can concurrently view 2D content from three planes (i.e., the parallel but spaced apart planes containing surfaces 134, 144, 454).

The device 400 further includes physical set pieces 491 and 493 that may further enhance the depth and space illusion by providing objects (such as scenery or the like) that are visible but at differing distances from the viewer and first display surface 134 (and other display surfaces 144, 454) such that a 3D display now has visual components at 5 layers or distances rather than merely at 3 distances.

Figure 5:
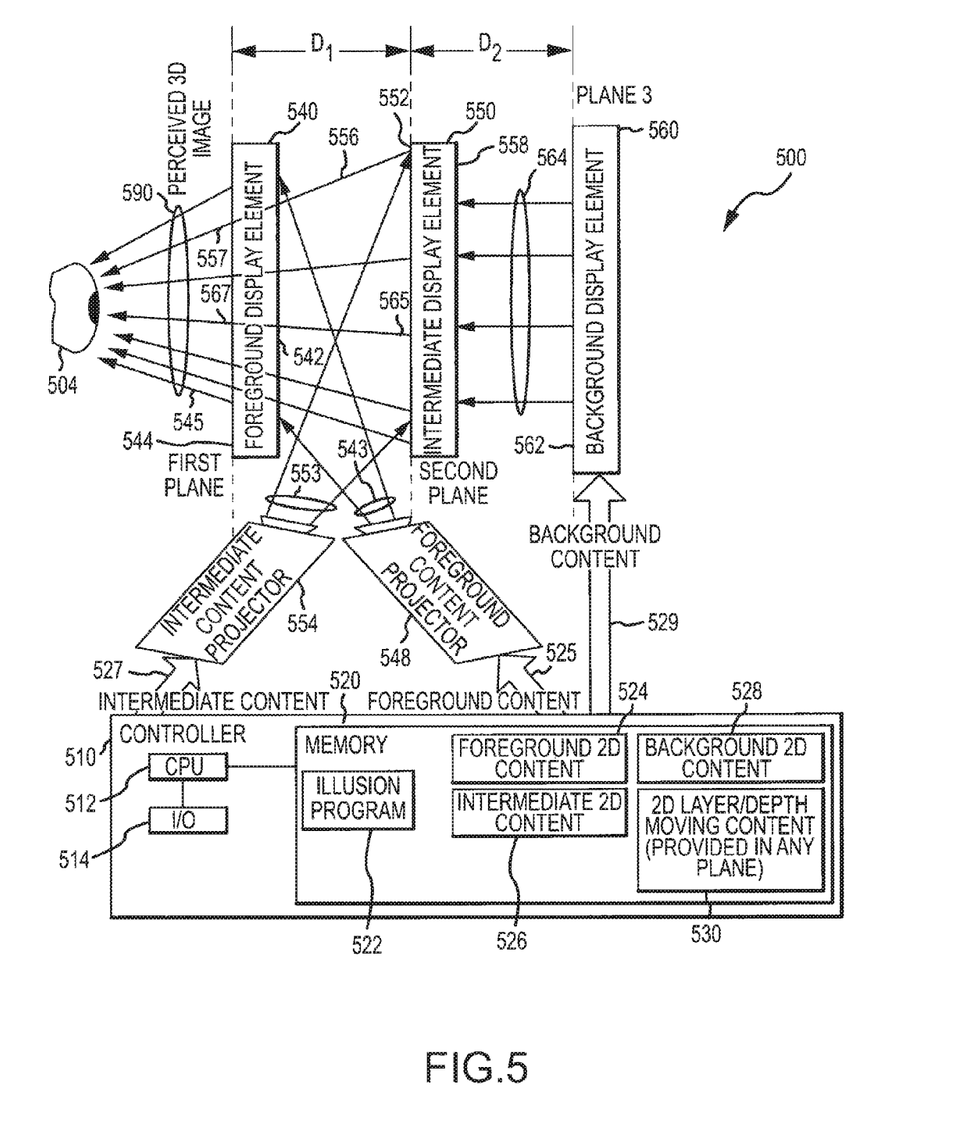
FIG. 5 is a schematic or functional block diagram showing components of a 3D display device (such as that shown in FIG. 1) with ray tracings illustrating flow of light containing 2D content through the device components to create a perceived 3D image for a viewer.

With the exemplary physical implementations of devices 100 and 400 understood, it may be useful to describe the 3D display techniques and components of a working device/system in more functional ways. FIG. 5 illustrates schematically or in functional block form a 3D display system 500 that is used to generate a 3D image 590 that may be perceived by a viewer 504 (e.g., as light from two, three, or more planes strikes his eyes). As shown, the system 500 includes a controller or control system 510 that functions to selectively feed 2D content to the display devices or assemblies. The controller 510 may take the form of a computer or similar electronic device with a hardware processor(s) 512 (e.g., one running one or more operating systems and software packages) managing input and output devices 514 such as a keyboard, a mouse, a touchscreen/pad, and the like to allow a human operator provide input to control operation of system 500, e.g., to select and initiate an illusion program 522, to manually select 2D content 525, 527, 529 for display on the various planes of the multiplane device 500, to cause 2D media 530 to jump between display element/planes, and/or the like.

The CPU 512 also manages (or accesses) memory or data storage 520. The CPU 512 may run code or programs such as illusion/3D display program 522, which is configured to cause the computer/controller 510 to perform particular functions or display method steps such as to feed particular content 525, 527, 529 to projectors 548, 554 and emissive display device 560. In the memory 520 (or in other storage (not shown) accessible by CPU 512), media or digital content (e.g., still or video image files) useful for creating the 3D image 590 is stored and selectively played or projected by the device 500. Specifically, memory 520 stores foreground 2D content 524, intermediate 2D content 526, and background 2D content 528.

When the CPU 512 runs the illusion program 522, sets of the foreground 2D content 524 may be chosen/retrieved and transmitted 525 to the foreground content projector 548. As shown, the foreground content projector 548 projects these images/light 543 onto a rear or back surface 542 of the foreground display element 540 (e.g., a transparent projection screen film or the like). This results in 2D foreground imagery 545 being received by viewer 504 from front or display surface 544 as part of perceived 3D image. The images 545 may appear to be in a first plane that contains the display surface 544 (or surface 542 or a location between these two surfaces which are separated by a relative thin film of material or layers of material such as less than about 0.125 inches).

Further when the program 522 is run, sets of the intermediate 2D content 526 may be chosen and transmitted 527 to the intermediate content projector 554. For example, a number of frames of digital content that are linked to frames of digital content in the sets of the foreground 2D content may be retrieved for projection concurrently and in a synchronized manner with the foreground content 525. As shown, this content 527 is provided to the projector 554 which projects light/content 553 onto the front or display surface 552 of the intermediate display element 550 (but it may be the back or rear surface 558 in some embodiments). This causes the 2D content/light 556 to be transmitted (reflected) toward the rear surface 542 where it passes through the layers of the film of element 540 for viewing via front display surface 544 by viewer 504 as shown by rays 557. The 2D content 557 is contained within the 3D image 590 viewed by the viewer 504, but it will be perceived to be at a distance, $D_1$, behind or offset from the foreground 2D content 545 (such as several inches to 1 to 2 feet or more). The depth or difference in location of these images is related to the location of the second display plane containing the display or front surface 552 relative to the first display plane (e.g., the foreground display element 540).

Still further, when the program 522 is run by CPU 512, sets of the background 2D content 528 are chosen and transmitted 529 to the background display element 560 (e.g., an LCD monitor or the like) for display on front or display surface 562. This results in 2D background images or content 564 being projected or transmitted toward viewer 504, with the rays 564 first striking rear surface 558 of intermediate display element 550 and passing through this element 550 and then striking rear surface 542 and passing through this element 540 as shown with rays 567. The rays 567 containing the 2D background content 529 are visible by the viewer 504 in perceived 3D image 590 concurrently with rays 545, 557 containing foreground and midground 2D content 525, 527, but at a differing depth or offset. To this end, background display surface 562 is at a distance or offset, $D_2$, as measured between the second and third display planes (with the third display plane containing the display surface 562), and the distance, $D_2$, may be several inches up to several feet or more (such as 10 to 28 inches or the like).

In some embodiments, the 3D display device 500 is configured to provide 2D content or media that jumps between the first, second, and third planes (or content that is handed off between display elements 540, 550, 560). Memory 520 is shown to include layer or depth moving content 530 that can be displayed in any of the display planes or that may be included in the sets of content retrieved from by illusion program 522 in content 524, 526, 528. For example, the content 524, 526, 528 may be processed to contain 2D content that is first shown in one of the planes and then in another. In a specific example, the foreground content 525 may initially include a 2D image of a character or object and display this character or 2D element for a number of frames. Then, the character may be included in the intermediate content 527 (and no longer in the foreground content 525). This may be synchronized such that it is in the same or nearby X-Y location of the displayed image/real estate but have a different size (e.g., moving away from viewer), and, in this manner, the depth between the display planes associated with display surfaces 544, 552 appears in 3D image 590 to the viewer 504 to be more solid as the displayed character jumps between displayed 2D images/content at differing depths or layers of the 3D image 590 in a short time (e.g., the jump may be nearly instantaneous).

Figure 6A:
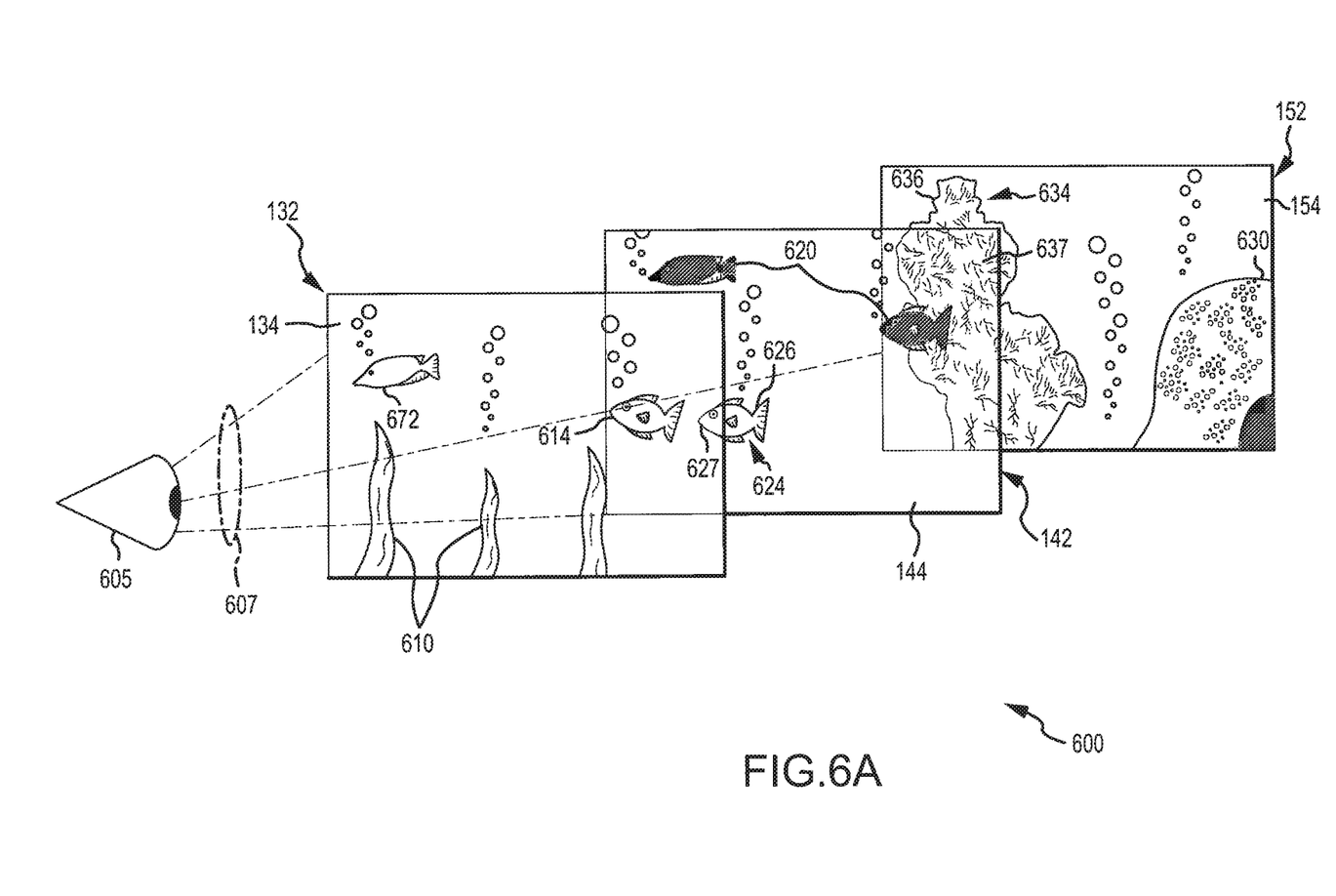
FIGS. 6A-6C illustrate schematically a multiplane display device with three layers or planes of display apparatuses displaying 2D content and showing a plane jumping or depth changing display technique in which 2D content is handed off from display device to display device by a controller to enhance the 3D or depth and space illusion achieved by the multiplane display device.
Figure 6B:
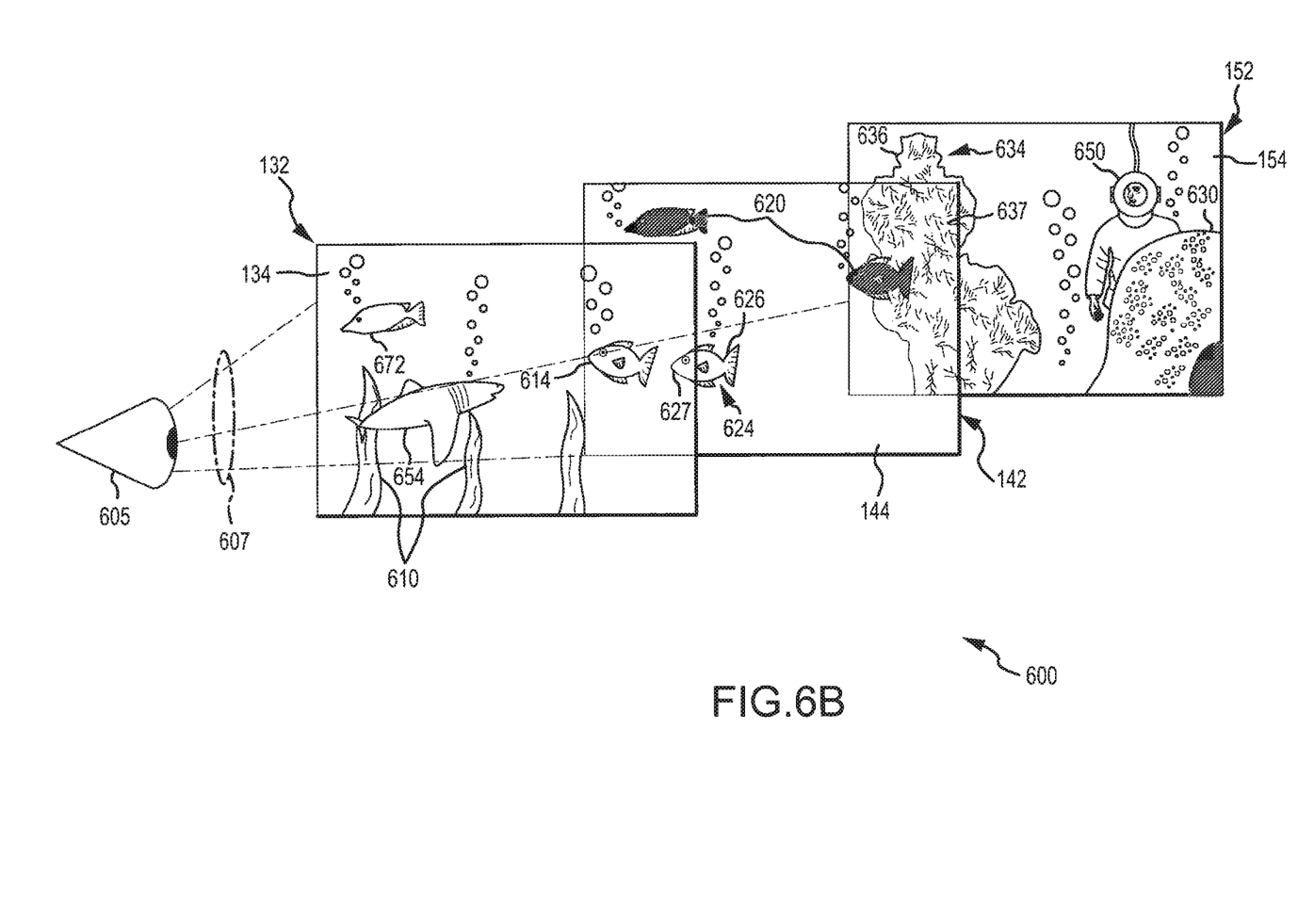
Figure 6C:
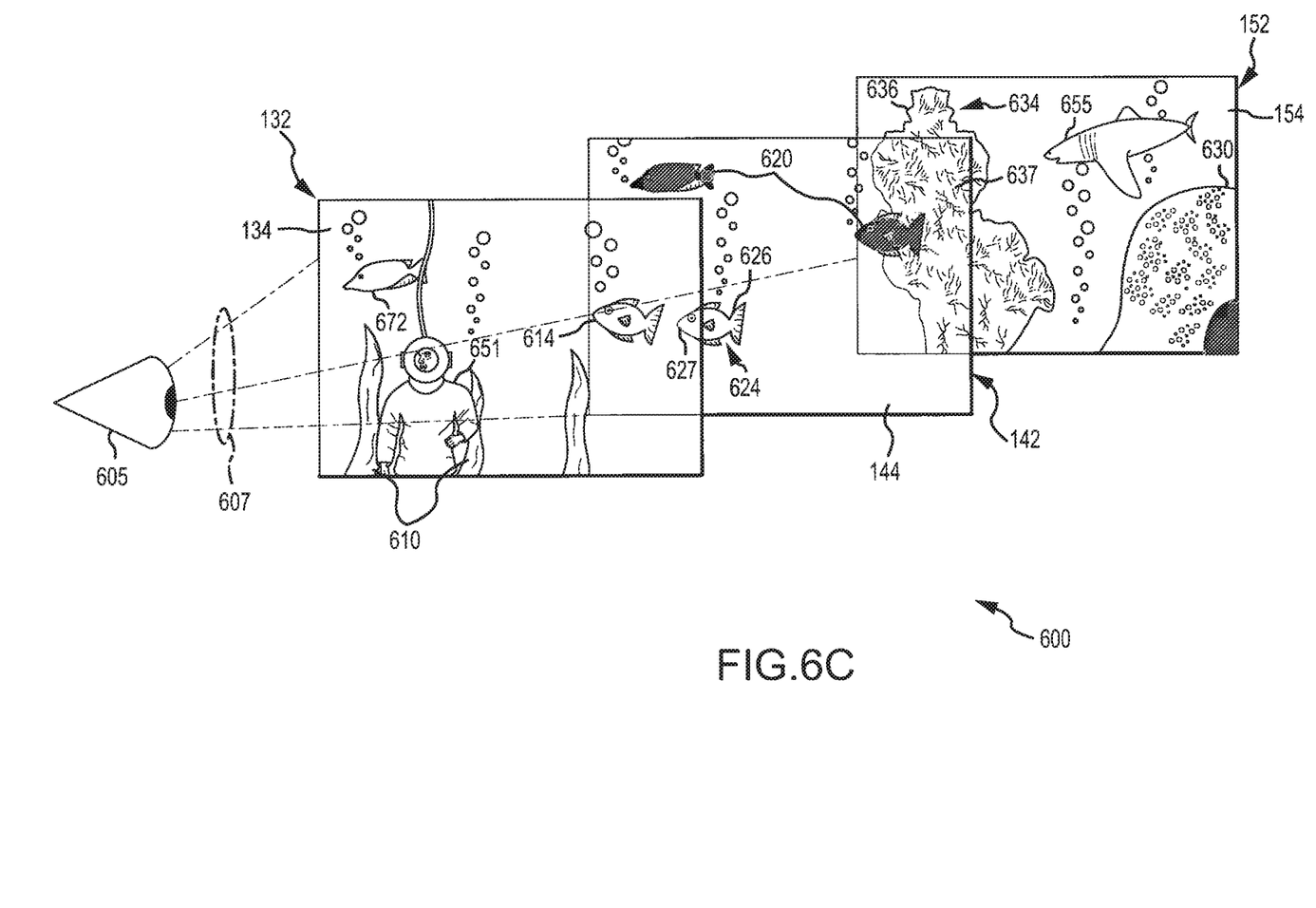

FIGS. 6A-6C illustrate a schematic perspective view of a 3D display device 600 during its operation to present a 3D image 607 to a viewer 605. The 3D display device 600 includes the first, second, and third display elements 132, 142, 152 (as shown in FIGS. 1-3). The first or foreground display device 132 is being used (such as with a rear projection) to display foreground 2D content on the front or display surface 134 that includes 2D elements 610, 672, and 614. The viewer 605 perceives a 3D image 607 with these components 610, 672, 614 at a first or base depth (e.g., at 2 feet away when they are 2 feet from the front surface 134 or from a 3D view zone). The display element is at transparent (at least in places where images/content 610, 672, 614 are not being displayed).

During operation of the 3D display device 600 shown in FIG. 3A, the second or intermediate display device 142 is being used (such as with a front or rear projection) to display intermediate 2D content on the front or display surface 144 that includes 2D elements 620 and 624, with component 624 shown in two pieces 626, 627 to show that at least a portion 627 is visible via front surface 134 (such as in 3D image 607 by viewer 605). The surface 144 is in a second plane that is spaced apart from the plane containing surface 134 such that the 2D components 620, 624 appear to be a distance behind or offset from foreground 2D content 610, 672, 614, which provides depth to image 607. Further, the background display device 152 is being used (such as via front or rear projection or via operation of an emissive display such as an LCD) to display background 2D content in the form of components 630 and 634, with component 634 shown in two pieces 636, 637 so as to indicate that at least a portion 637 is visible through the intermediate display surface 144 behind components 620.

The surface 154 is in a separate and spaced apart display plane relative to the plane containing surface 144 such that when the content 630, 634 is included in 3D image via front display surface 134 the viewer 605 perceives the content 630, 634 to be some distance (e.g., the distance between surfaces 144 and 154) behind the intermediate 2D content components 620, 624 and another further distance (e.g., the distance between surfaces 134 and 154) behind or offset from foreground 2D content components 610, 672, 614. Again, the screen or film used for device 144 is at least translucent and preferably nearly transparent in portions not being used to display content 620, 624 so as to allow the content 630, 634 to readily pass to foreground display element 132 and viewer 605 in image streams or light 607.

The display device 600 in FIG. 6A may be considered a first operating state or base/original state used to create a 3D image 607. Now, in FIG. 6B, the 3D display device 600 is operated in a second operating state to create a new 3D image 607. In this operating state, a differing or second set of 2D content is being provided to both the foreground and background display elements 132, 152, e.g., plane or layer jumping/moving 2D content. The plane or layer jumping/moving content (or additional 2D content) of the background 2D content includes a 2D component or image 650 (e.g., a deep sea diver in this example) while the plane/layer jumping content (or added content) of the foreground 2D content includes a 2D component or image 654 (e.g., a large fish or shark in this example). FIG. 6C shows the display device 600 operating in a third operating state to create a revised or new 3D image 607. The 2D content 651 has been added to the foreground 2D content for display on foreground display surface 134 (and content 650 deleted from background 2D content on display element 152), and concurrently 2D content 655 has been added to or moved to the background 2D content for display on the background display surface 154 (and content 654 deleted from foreground 2D content on display element 132). In such a manner, the 3D display device 600 is operable to have 2D content handed off or moved between the spaced apart display planes, which causes the viewer 605 to perceive via 3D imagery 607 that the device 600 has solidity or substance between the display surfaces 134, 144, 154 rather than merely air or space and adds to the achieved 3D illusion.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Some of the examples provides showed a three-layer embodiment, but it will be understood that more layers may be utilized such as 4 to 6 or more layers in a multiplane image display system/apparatus. Each layer may be projected upon or may be used to provide physical props. Additionally, physical props may be positioned in front of or behind any of the layers (e.g., between the display surfaces 134 and 144 and/or between surfaces 144 and 154 or behind surface 154 or in front of surface 134 in the apparatus 100 shown in FIG. 1). The use of physical props (2D or 3D objects) may help a viewer to believe the depth and dimensions of the illusion created by the display apparatus.

The display devices described herein lend themselves to scalability. For example, the display devices may be small kiosk size with the use of LED projectors and the like but may also be used to provide much larger scale scenery (such as many feet in height and width and several to many feet in depth). Further, although not shown, one of the layers of the display device may be a mirror bounce-type configuration, which may be useful when space is constrained or an odd space is used for providing one of the display devices. For example, this mirror-bounce layer may include a sheet of 50 percent mirror glass if on the first or second layers of a three-layer embodiment (or one of the foreground layers if more than 3 layers) or be provided as a full mirror if provided as the third (or background) layer.

We claim:

1. An apparatus for creating an auto stereoscopic display, comprising:
    a foreground display assembly including a foreground display element with a front surface and a rear surface and a projector projecting a first set of two-dimensional (2D) content onto the rear surface that is viewable by a viewer via the front surface;
    a background display assembly including a background display element spaced apart from the foreground display element and with a front surface facing toward the rear surface of the foreground display element, the background display element displaying a second set of 2D content on the front surface of the background display element; and
    an intermediate display assembly including an intermediate display element positioned between the foreground display element and the background display element with a front surface facing and spaced apart from the rear surface of the foreground display element and with a rear surface facing and spaced apart from the background display element, the front surface of the intermediate display element displaying a third set of 2D content, wherein the foreground and intermediate display elements comprise screens that are at least partially transmissive to light, whereby the displayed first, second, and third sets of 2D content are concurrently viewable via the front surface of the foreground display assembly,
    wherein the background display element comprises an emissive display device with a monitor providing the front surface of the background display element and wherein the intermediate display element comprises an optical shutter window.

2. The apparatus of claim 1, wherein the foreground display element and intetniediate display element each comprise a film of at least translucent material and the foreground display assembly includes a projector projecting the first set of 2D content on the rear surface of the foreground display element.

3. The apparatus of claim 2, wherein the foreground display element comprises a transparent projection screen film.

4. An apparatus for creating an autostereoscopic display, comprising:
    a foreground display assembly including a foreground display element with a front surface and a rear surface and a projector projecting a first set of two-dimensional (2D) content onto the rear surface that is viewable by a viewer via the front surface;
    a background display assembly including a background display element spaced apart from the foreground display element and with a front surface facing toward the rear surface of the foreground display element, the background display element displaying a second set of 2D content on the front surface of the background display element; and
    an intermediate display assembly including an intermediate display element positioned between the foreground display element and the background display element with a front surface facing and spaced apart from the rear surface of the foreground display element and with a rear surface facing and spaced apart from the background display element, the front surface of the intermediate display element displaying a third set of 2D content, wherein the foreground and intermediate display elements comprise screens that are at least partially transmissive to light, whereby the displayed first, second, and third sets of 2D content are concurrently viewable via the front surface of the foreground display assembly,
wherein the intermediate display assembly includes a projector projecting the third set of 2D content onto the front surface of the intermediate display element and wherein the intermediate display element comprises an optical shutter window.

5. The apparatus of claim 1, wherein frames of the first, second, and third sets of 2D content are displayed in a synchronized manner to provide a combined 3D image in which the first set of 2D content is in a first display plane, the third set of 2D content is in a second display plane an offset distance from the first display plane, and the second set of 2D content is in a third display plane an offset distance from the second display plane.

6. The apparatus of claim 5, wherein the first, second, and third display planes are parallel to each other and the offset distances are each at least about 6 inches.

7. A 3D display device, comprising:
an emissive display device displaying a first set of 2D images on a monitor surface;
a foreground display assembly comprising a substantially transparent film with a front surface and a rear surface facing and spaced apart a distance from the monitor surface, wherein the foreground display assembly further comprises a projector projecting a second set of 2D images onto the rear surface of the substantially transparent film and wherein the first and second sets of 2D images are concurrently viewable via the front surface of the foreground display assembly; and
a midground display assembly comprising an optical shutter window positioned between and spaced apart from the substantially transparent film of the foreground display assembly and the monitor surface of the emissive display device.

8. The 3D display device of claim 7, wherein the substantially transparent film comprises a transparent projection screen film or an optical shutter window.

9. The 3D display device of claim 7, wherein the midground display assembly includes a projector projecting a third set of 2D images displayed in a display plane between a plane containing the substantially transparent film and a plane containing the monitor surface, whereby the 2D content of the first, second, and third sets is displayed on three spaced apart parallel planes.

10. The 3D display device of claim 7, wherein in a first operating state of the 3D display device the first set of 2D content includes a 2D image component and in a second operating state of the 3D display device the second set of 2D content includes the 2D image component, whereby over an operating period content moves between two display planes of a 3D image.

11. The 3D display of claim 7, wherein the first set of 2D content and the second set of 2D content are at least partially non-overlapping in a display portion of the front surface and wherein the monitor surface is substantially parallel to the rear surface and spaced apart by at least about 10 inches.

12. An autostereoscopic display method, comprising:
displaying a set of 2D foreground content including whole 2D objects on a light transmissive foreground display element;
concurrently with the 2D foreground content displaying, displaying a set of 2D intermediate content including whole 2D objects on a light transmissive intermediate display element spaced apart from the foreground display element;
concurrently with the 2D foreground and intermediate content displaying, displaying a set of 2D background content including whole 2D objects on a background display surface that is spaced apart from the intermediate display element, wherein the intermediate display element is positioned between the foreground and background display elements; and
sequentially displaying a 2D image element in the sets of 2D foreground, intermediate, and background content, whereby over a time period the 2D image element is first displayed on the foreground display element, second displayed on the intermediate display element and deleted from the foreground display element, and third displayed on the background display element and deleted from the intermediate display element.

13. The method of claim 12, wherein the foreground display element comprises a transparent projection film and the displaying of the set of 2D foreground content includes projecting a 2D still or video image on an inner surface of the transparent projection film.

14. The method of claim 12, wherein the intermediate display element comprises an optical shutter window and wherein the displaying of the set of 2D intermediate content includes projecting a 2D still or video image onto the optical shutter window.

15. The method of claim 14, further including, during the displaying of the set of 2D intermediate content, changing a voltage applied to the optical shutter window to vary a transparency of the intermediate display element.

16. The method of claim 12, wherein the background display element comprises an emissive display device and the background display surface comprises a screen of a monitor of the emissive display device.

17. The method of claim 12, further comprising processing a 2D media file to generate the sets of 2D foreground, intermediate, and background content, whereby each frame of the sets of 2D foreground, intermediate, and background content includes images associated with a frame of the 2D media file.

* * * * *